Figure 1:
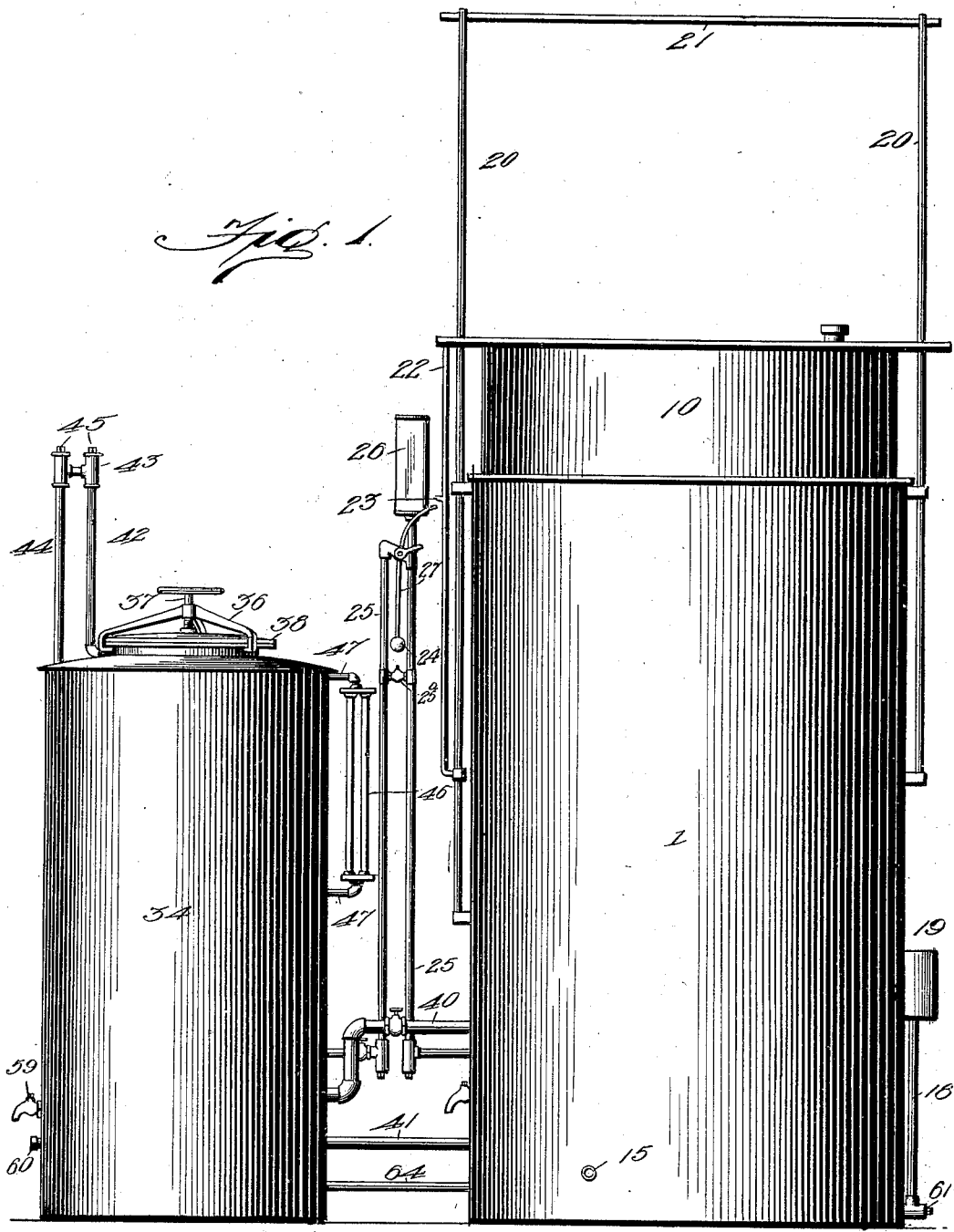

No. 666,208. Patented Jan. 15, 1901.
J. W. REEDER.
ACETYLENE GAS GENERATOR.
(Application filed June 9, 1900.)
(No Model.) 5 Sheets—Sheet 1.

Witnesses

Inventor
James W. Reeder,
By Victor J. Evans
Attorney

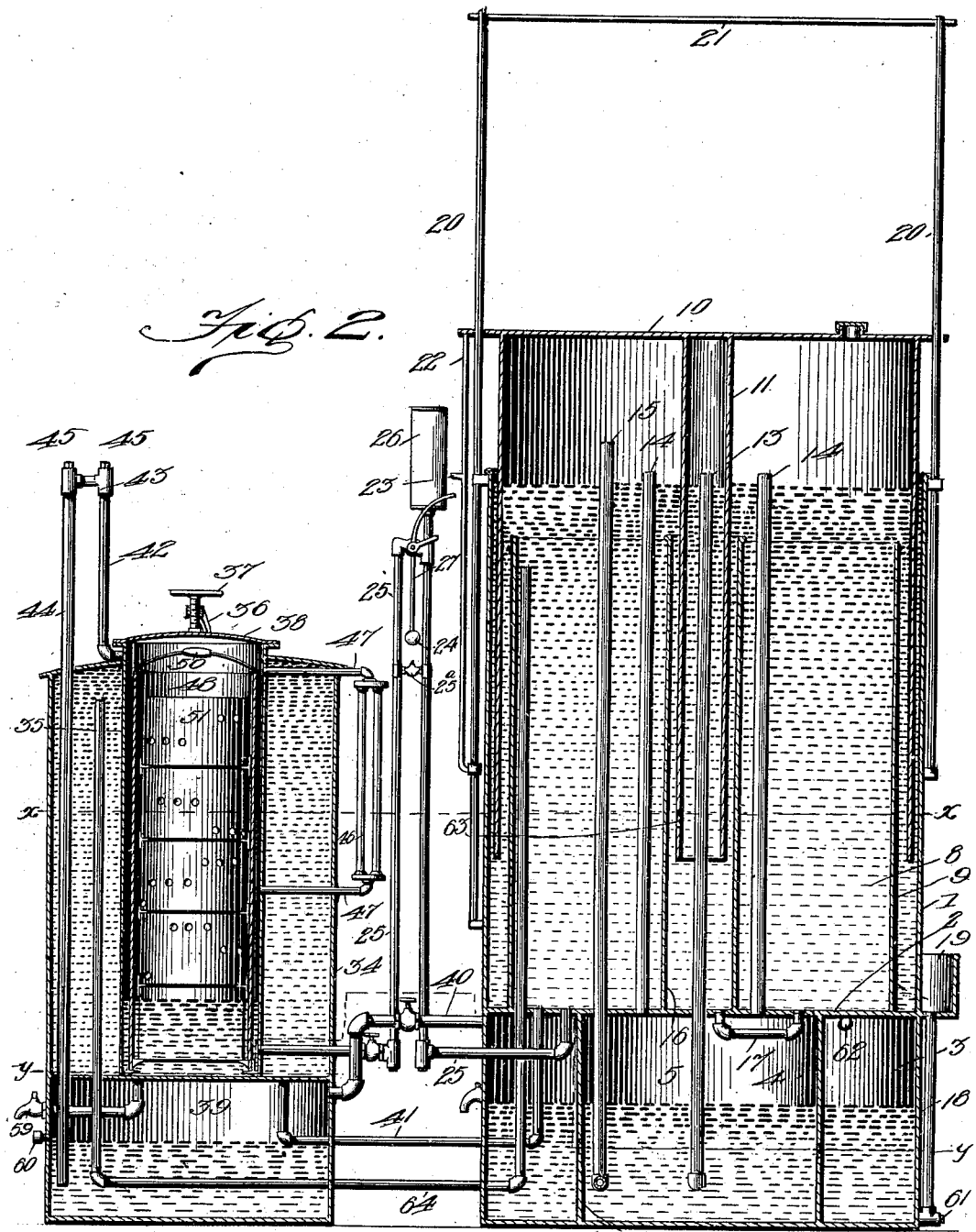

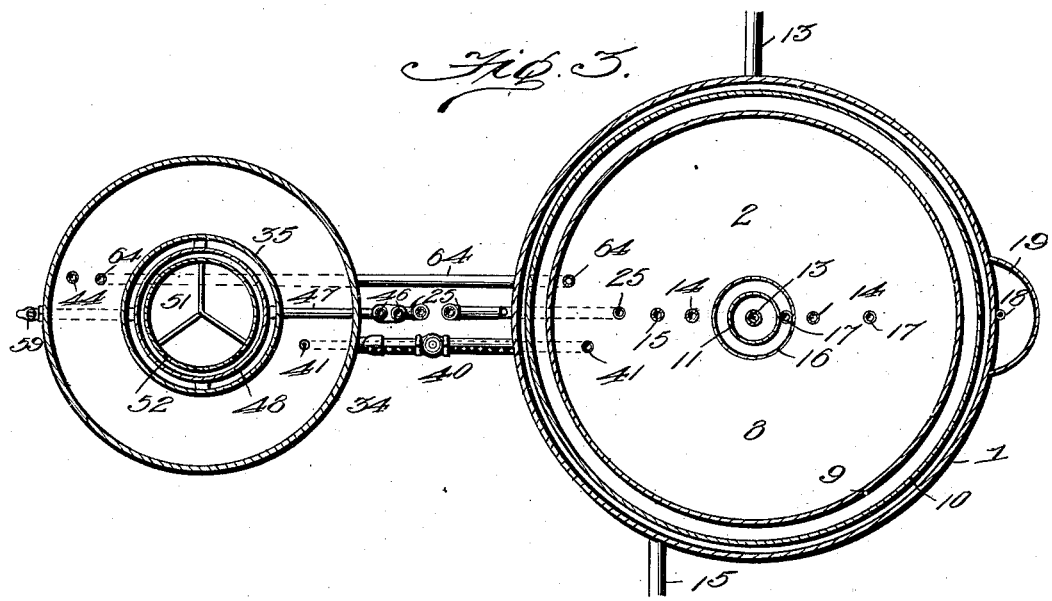

No. 666,208. Patented Jan. 15, 1901.
J. W. REEDER.
ACETYLENE GAS GENERATOR.
(Application filed June 9, 1900.)
(No Model.) 5 Sheets—Sheet 4.
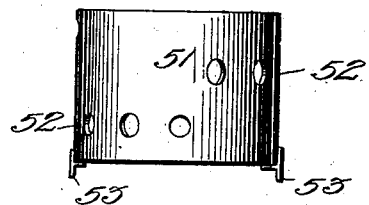
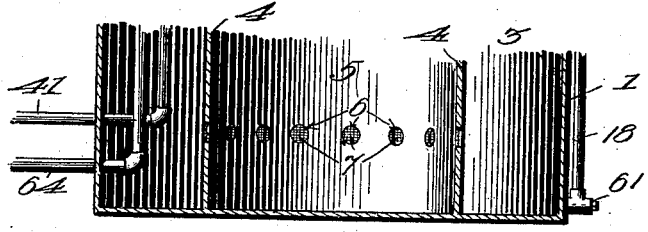
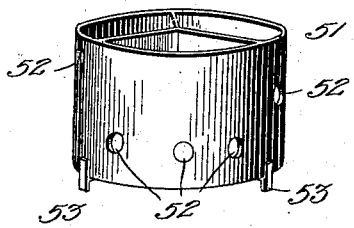
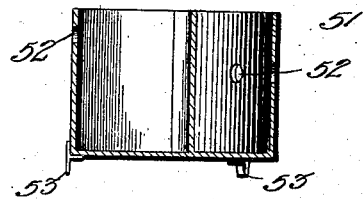
Witnesses
Inventor
James W. Reeder,
By Victor J. Evans
Attorney

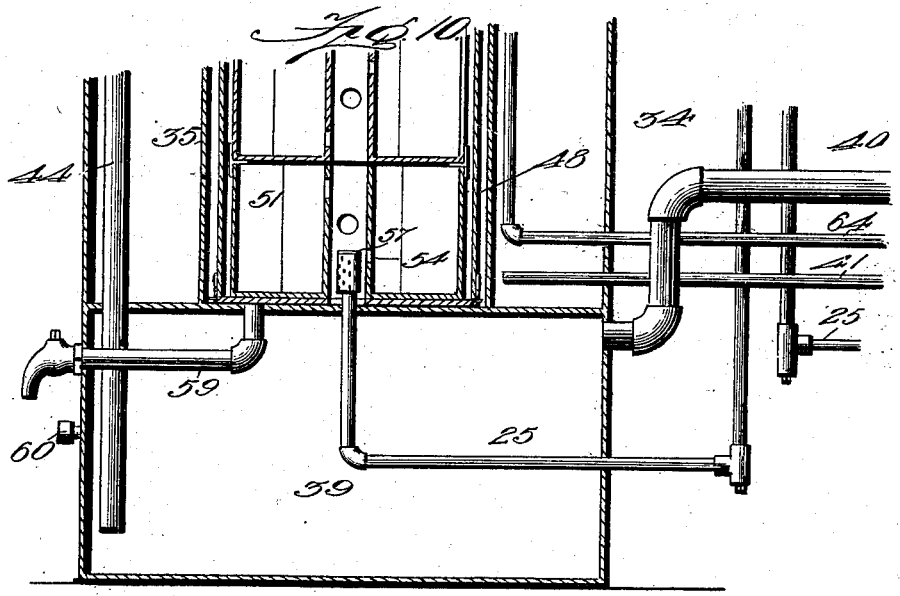

UNITED STATES PATENT OFFICE.

JAMES W. REEDER, OF GOLDEN DALE, WASHINGTON.

ACETYLENE-GAS GENERATOR.

SPECIFICATION forming part of Letters Patent No. 666,208, dated January 15, 1901.

Application filed June 9, 1900. Serial No. 19,728. (No model.)

*To all whom it may concern:*

Be it known that I, JAMES W. REEDER, a citizen of the United States, residing at Golden Dale, in the county of Klickitat and State of Washington, have invented new and useful Improvements in Acetylene-Gas Generators, of which the following is a specification.

This invention relates to new and useful improvements in acetylene-gas generators;
and its primary object is to provide a device which is safe and economical in operation and is adapted to produce a pure gas from calcium carbid and to furnish the same perfectly dry to burners.

A further object is to so construct the device that the minimum amount of air will be admitted thereto when the same is recharged.

Another object is to provide means, controlled by the gas generated within the device, whereby the supply of water to the carbid is regulated.

A still further object is to so construct the generator as to reduce the heat and prevent the danger incident to the generation thereof.

Other objects are to arrange the carbid in separate receptacles, whereby the same will be acted upon successively, and to provide a novel holder for the receptacles.

To these ends the invention consists in providing a cylindrical tank or generator having two compartments therein, the upper one of which contains the carbid, while the lower compartment is utilized as a condenser. A water-jacket surrounds the carbid, which is arranged within a well formed within the center of the upper compartment, and said water communicates with the interior of the water-tank of the gasometer. The water within the generator is kept under pressure and circulates therein and thereby carries off the heat which is created in the carbid-chamber during the generation of the gas. Fitted within the well of the generator is a bucket of peculiar construction, within which are fitted a suitable number of receptacles of peculiar form, each receptacle being divided into three or more compartments open at the top. The compartments of each receptacle are water-tight and are each provided with openings in their walls. Said openings are horizontally disposed and are arranged at a different or regular grade of height from the bottoms of the cup. It will be seen that each compartment will receive the water as the same is gradually admitted to the well independently of any other compartment. The gasometer is of peculiar construction and is provided at the bottom thereof with a water-containing compartment having a chamber in the center thereof, provided with apertures in its walls at a point below the surface of the water. A tank is arranged at a point above this receptacle, and the contents of said tank are adapted to flow into the jacket of the generator, as before mentioned. The bell or top of the gasometer is arranged in the ordinary manner above the water-tank and is provided with means whereby the gas may escape when generated too rapidly. This bell is also provided with means of peculiar construction, whereby the flow of water from the supply to the well of the generator may be controlled automatically by the movement of said bell.

The invention also consists in the further novel construction and combination of parts hereinafter more fully described and claimed, and illustrated in the accompanying drawings, showing the preferred form of my invention, and in which—

Figure 1 is a side elevation of the device. Fig. 2 is a longitudinal section therethrough. Fig. 3 is a section on line $xx$, Fig. 2. Fig. 4 is a section on line $yy$, Fig. 2. Fig. 5 is an enlarged section through the lower compartment or "washer" of the gasometer. Fig. 6 is a plan view of a carbid-receptacle. Fig. 7 is a side elevation thereof. Fig. 8 is a perspective view. Fig. 9 is a longitudinal section therethrough. Fig. 10 is an enlarged section through the lower portion of a modified form of generator. Fig. 11 is a plan view of a modified form of receptacle. Fig. 12 is a section therethrough. Fig. 13 is a section through the bottom of the bucket. Fig. 14 is a side elevation of a modified form of valve-operating mechanism. Fig. 15 is an elevation of the operating-wheel of said mechanism, and Fig. 16 is a section through the nozzle of the supply-pipe.

Referring to said figures by numerals of reference, 1 is the fixed wall of the gasometer, which may be formed of any suitable material, and a partition 2 is provided therein, which forms a lower compartment or washer 3. A wall 4 extends from the top to the bottom of this compartment and forms an interior chamber or receptacle 5, apertures 6 being formed within the wall and provided with wire-gauze 7, as shown in Fig. 5. This washer is adapted to be filled with water to a point above the upper edge of the apertures 6 and is for the purpose hereinafter more fully set forth.

A tank 8 is formed upon the partition 2, and its walls, together with the wall 1, form a compartment or seal 9, which is filled with water or other suitable liquid and is adapted to receive the wall of the bell 10 of the gasometer. This bell extends over the tank 8 and is provided at its center with a downwardly-extending tube 11, which is adapted to receive an escape-pipe 13, extending above the tank, and has a suitable outlet. (Not shown.) Pipes 14 extend from the top of the inner compartment of the washer to a point above the tank, and a suitable outlet-pipe, as 15, extends from the interior of the bell to a drier, which may be of any desired construction and which is not shown.

The tube 11, heretofore referred to, is adapted to be received by a tube 16, which extends upward from the bottom of the tank and communicates with the tank through a pipe 17, as shown.

The washer 3 may be filled with water in any suitable manner, as through a pipe 18, connecting the same with a receptacle 19, formed upon the side of the wall 1.

Secured to the outer wall 1 of the gasometer, at opposite sides thereof, are rods 20, which serve as guides for the bell 10, said rods being connected at the top in any suitable manner, as by means of a cross-strip 21. Extending downwardly from this bell is an arm 22, which is slidably mounted at its lower end upon the guide-rod 20 adjacent thereto. A pin or projection 23 extends outwardly from the arm at an angle thereto, as shown. A pipe 25 extends from the bottom of the tank 8 upward to a point without the gasometer and preferably on a line with the top of said tank. This pipe is provided at its upper end with a suitable gage, as 26, whereby the height of the water within the tank may be indicated. A suitable valve is located within this pipe and is provided with a stem, to which is secured a lever 27. This lever is provided at its lower end with a weight 24, and its upper end is preferably curved, so as to lie normally within the path of the pin 23. It will be seen that when the bell of the gasometer is in lowered position the pin 23 will hold the weight 24 and lever 27 inverted, permitting water to flow into the generator through the valve. The gas generated as the result of the admission of water will obviously raise the bell and the lever 27 will be gradually released, the weight finally returning to its normal position and closing the valve. While this regulating device is simple and effective in operation, I do not limit myself thereto, as, if desired, the operating mechanism shown in Fig. 15 may be substituted therefor. In said figure the bell is shown provided with a downwardly-extending arm 28, which is slidably mounted upon the guide-rod 20 and provided at regular intervals with inwardly-extending projections or teeth 29. These teeth are adapted to engage similar teeth or projections 30, formed upon the periphery of a wheel 31, which is secured to a stem 32, projecting from the valve within the pipe 25. A weight 33 is formed with or secured to this wheel, so as to hold the same normally in the position shown in Fig. 15. It will be seen that a sufficient number of teeth are provided upon the arm 28 to impart a one-half revolution to the wheel upon each up-and-down movement of the bell of the gasometer. It will be understood that the weight 33 will immediately return the valve to its closed position when the wheel is disengaged from the teeth of the arm 28.

The pipe 25 extends downward from the valve therein and through the wall 34 of the generator. This generator may be of any desired form and material and is partitioned into an upper and a lower compartment, said upper compartment having a tubular wall 35 in the center thereof, forming a well. A cross-strip 36, of strong material, as iron or steel, is detachably secured to the top of the generator and has a threaded passage in the center thereof for the reception of a screw 37, which is adapted to clamp upon a cover 38, which fits over the top of the well, thereby sealing the same and making it air-tight.

It is of course understood that the generator is both air and water tight. The lower compartment or condenser 39 thereof is adapted to be partly filled with water and is connected by means of a pipe 40 with the upper portion of the washer 3, as shown. The upper compartment of the generator is filled with water, which completely incloses the well 35, said water being admitted to the generator from the tank 8 of the gasometer through a pipe 41.

A pipe or conveyer 42 extends upward from the upper end of the well 35 and is secured to a T-shaped joint 43, which in turn is connected to a similar joint formed at the upper end of a pipe 44, the lower end of which is arranged at a point below the level of the water within the condenser 39. These joints 43 are each provided at their upper ends with removable caps 45, whereby access to the pipes 42 and 44 may be readily obtained for the purpose of cleaning the same, &c.

The pipe 25, heretofore referred to, extends through the outer wall of the generator 34 and opens into the well 35 at a point within the bottom thereof. A gage 46 is arranged without said generator and is connected with the well by means of pipes 47, as shown.

Loosely fitted within the well 35 is a bucket 48, which is provided with a detachable bottom 49, as shown in Fig. 13. Suitable perforations are also formed within this bucket, whereby water may be admitted thereto, and a bail or handle 50 extends from the upper edge thereof. This bucket is adapted to receive one or more carbid-receptacles 51 of peculiar construction. As shown in Figs. 6, 7, 8, and 9, each of these receptacles is divided into three separate compartments, which are open at the top, and each compartment contains one or more perforations 52 within its outer wall. The perforations of each compartment are arranged at a greater or less distance from the bottom of the receptacle than the perforations of the adjoining compartment.

Secured to the bottom of each receptacle 51 are three or more projections 53, which are adapted to rest upon and overlap the top of the adjacent receptacle when said receptacles are placed one upon the other within the bucket, as shown in Figs. 2 and 10. It is obvious that when the receptacles are arranged in this manner any gas generated therein by the admission of water through the openings within the outer walls thereof will escape through the apertures formed between the receptacles by the projections 53. While I have shown and described these receptacles as provided with inlets within their outer walls, I do not limit myself to such construction, for, if desired, each receptacle may be provided with a tubular passage 54 within the center thereof, as shown in Figs. 11 and 12, said passages communicating with the interior of each compartment through inlets 55, as shown in Fig. 10. When receptacles of this character are employed, the inlet-pipe 25 is preferably extended through the bottom of the well 35 and into the tube of the lower receptacle 51, Fig. 10, the end of said pipe being provided with a nozzle of peculiar construction. This nozzle comprises an outer perforated cylindrical casing 56, which is provided with a detachable cap 57, whereby cotton or other similar material 58 may be placed therein and securely retained in position.

The well 35 is provided with an outlet 59, whereby the water, &c., may be readily removed therefrom as desired. This outlet may be provided with a valve of any suitable construction, as is obvious. A suitable inlet 60 is secured within the wall of the condenser, whereby water may be admitted thereto and removed therefrom. The washer is also supplied with an outlet, as 61, and it is of course understood that each of these outlets may contain a valve of suitable construction.

Water is admitted to the tank 8 in any preferred manner, as through a supply-pipe 62, and it is obvious that it will completely fill said tank and the tube 16 therein. Water will be conveyed through this tank to the generator 34, filling the same and completely inclosing the well 35 therein. The cover 38 of the well is removed by slipping the cross-strip 36 from position after first loosening the screw 37. The bucket 48 is then lifted from the well and the bottom 49 thereof removed. The receptacles 51 are filled with carbid and arranged upon the detached bottom of the bucket, one upon the other, until a suitable number have been placed in position. Said bucket is then placed over the receptacles and placed in engagement with the bottom thereof and the entire bucket and the contents thereof are lowered into the well 35. The cover 38 is clamped in position, and after a sufficient amount of water has been placed within the condenser and the washer the device is in condition for use. The valve within the pipe 25 is normally closed, and will therefore permit water to flow from the tank 8 into the bottom of the well 35. This water will gradually rise within the well, as is obvious, first entering the lower port of the lower receptacle 51, causing the generation of gas within that compartment with which said ports communicate. Gas will escape from the top of the receptacle through the pipes 42 and 44 to the condenser 39, said gas rising from the outlet-pipe to the surface of the water. The gas will then pass through pipe 40 into the upper portion of the washer 3, and the pressure thereof will force the water therein downward until the gas is free to escape into the central compartment 5 through the aperture 6 within the walls thereof. As these apertures are provided with gauze or other similar material, the passage of impurities, &c., will be prevented. This gauze also serves to break the gas into small bubbles to facilitate the washing thereof. The gas will rise above the surface of the water within the receptacle 5 and thence through the pipes 14 to the interior of the bell 10. It will be seen that as the water continues to rise within the well 35 additional compartments within the receptacle 51 will be filled and the gas generated will immediately pass, as before described, to the bell 10. This will obviously cause the bell to slide upward upon its guide-rods 20, the valve will close as soon as the lever 23 is released by the arm 27, and thereby shut off the flow of water through the pipe 25 to the well 35. Should gas generate too rapidly, the bell will be lifted to such a height that perforations 63, formed within the tube 11, near the bottom thereof, will be brought to a point above the top of the tank 8, and thereby permit the escape of the gas through said perforations and out through the pipe 13, as is obvious. After the water has been shut off from the well 35, as before described, the generation of the gas will obviously cease, and the bell will then slide downward upon its guides, bringing the lever 23 again into contact with the arm 27 of the valve and opening the same. The operation, as heretofore described, will then be repeated.

It will be seen that a pipe 64 extends from the upper portion of the generator 35 to the upper portion of the tank 8, and that pipe 41, heretofore referred to, connects the bottoms of said generator and tank. By this arrangement the heat generated by the chemical action carried on within the carbid-receptacles causes the circulation of water through the pipes 41 and 64, and it is obvious that the well will thus be kept cool at all times and danger of explosion, &c., which has occurred in devices heretofore constructed, is obviated.

When the generator is of the construction shown in Fig. 10, the water, in lieu of being admitted through the side of the well, passes, as before stated, into the lower portion of the tube 54 of the lower receptacle 51, said water being admitted through the nozzle 58. This nozzle is, as before stated, filled with cotton or similar material, whereby impurities within the water are prevented from passing into the generator.

The operation of the valve-controlling mechanism shown in Fig. 15 will be readily understood. When the bell 10 moves upward upon its guide-rod 20, the toothed arm 28 is carried therewith, causing the wheel 31 to revolve, thereby shutting off the supply of water through the pipe 25, the weight 33 serving to retain the valve in this position. When the movement of the bell is reversed, said valve will be revolved in the opposite direction, opening the valve, as is obvious.

I do not limit myself to any particular means for fastening the bottom 49 to the bucket 48, but I have shown spring-plates 65 secured to said bucket within the bottom thereof, which will be adapted to engage with pins or any other similar device 66 projecting from the edge of the bottom.

By conveying the water to the carbid from the tank within the gasometer 2 important results are obtained. This arrangement permits the same gas-pressure upon the water-pipe at both the source and the discharge, and it is obvious that the water therein being under equal pressure at both ends will flow into the well by force of gravity only. Also it is well known that water within the gasometer absorbs a large quantity of gas, and therefore by conducting water from the tank to the well and replacing the same with fresh water the water within the tank is maintained in a pure state, obviating the odor usually arising therefrom. It also will be seen that the gas-containing water after being discharged into the well 35 is decomposed and the gas separated therefrom, and waste thereof is therefore prevented.

Any suitable form of drier may be used in connection with the distributing-pipe 15. It will be seen that when the generator is filled with carbid but the minimum amount of air is admitted thereto, as the well is nearly completely filled by the bucket and its contents.

As shown in Fig. 1, a pipe 25ª connects the sections of pipe 25, and this is provided with a suitable valve whereby water can be conducted from the gasometer to the generator independently of the automatically-operated valve in said pipe. This pipe is especially adapted for use where the wheel 31 is employed, and by its use the apparatus may be readily started, as is obvious. When the weighted lever 27 is used, this pipe is not necessary, for said lever may be readily lifted manually when it is desired to start the apparatus.

Having thus described my invention, what I claim as new, and desire to secure by Letters Patent, is—

1. In a device of the character described, the combination with a gasometer having a lower compartment and a tank, of a generator comprising an upper and a lower compartment, a well within the upper compartment, a water-jacket inclosing the well, a pipe connecting said well with the tank of the gasometer, pipes connecting the upper and lower portions of the jacket with the corresponding portions of the tank whereby a circulation of water is permitted, such circulation being established by the heat generated within the well; an outlet from the well, a pipe connecting the well with the lower compartment of the generator, and a connecting-pipe between the lower compartments of the generator and gasometer.

2. In a device of the character described, the combination with a gasometer having a tank therein, of a generator, a well therein communicating with the tank of the gasometer, a water-jacket inclosing the well, a cover to the well, means for clamping said cover in position, a bucket within the well, a bail thereto, a detachable bottom to said bucket having an aperture therein, catches for holding said bottom in position, a carbid-receptacle mounted within the bucket, compartments within said receptacle, perforations within a wall of each compartment, a second similar receptacle mounted thereon, and projections on the lower edge of said receptacle adapted to bear upon the lower carbid-receptacle and form an aperture therebetween.

3. In a device of the character described, the combination with a gasometer having a tank therein, of a generator, a well within the generator communicating with the tank of the gasometer, a water-jacket inclosing the well, pipes connecting said jacket and the tank whereby a circulation of water therebetween is permitted, such circulation being established by the heat generated within the well; pipes extending from the well through the water-jacket, and a transparent tube connecting said pipes and serving as a gage.

4. In a device of the character described, the combination with a gasometer having a tank therein; of a generator; a well within the generator; a perforated bucket within the well; carbid-receptacles within the bucket and having tubular passages in the center thereof communicating, through perforations, with the compartments within the receptacles; a pipe extending from the tank of the gasometer to the passage within the lower carbid-receptacle; a perforated casing upon the end of said pipe within the passage; an absorbent within the casing; and a removable cap.

5. In a device of the character described, the combination with a gasometer having a tank therein and a bell; of a generator, a well within the generator, a pipe connecting the tank and well, a valve within said pipe, a stem thereto, a wheel upon the stem, teeth extending from the wheel, a weight upon said wheel adapted to hold the valve normally in closed position, an arm to the bell, teeth thereon adapted to engage the teeth of the wheel, a jacket inclosing the well, and pipes connecting the upper and lower portions of the generator and the tank whereby a circulation of water is permitted between the tank and jacket, such circulation being established by the heat generated within the well.

6. In a device of the character described, the combination with a gasometer having a tank therein, of a generator, a well therein communicating with the tank of the gasometer, a water-jacket inclosing the well, a cover to the well, means for clamping said cover in position, a bucket within the well, a bail thereto, a detachable bottom to said bucket having an aperture therein, catches for holding said bottom in position, and a carbid-receptacle mounted within the bucket.

In testimony whereof I affix my signature in presence of two witnesses.

JAMES W. REEDER.

Witnesses:
WINTHROP B. PRESLEY,
J. H. HILL.